US012673588B2

(12) United States Patent
Feng et al.

(10) Patent No.: US 12,673,588 B2
(45) Date of Patent: Jul. 7, 2026

(54) VERTICAL LATCH LOCKING MECHANISM FOR ROTATING SEAT

(71) Applicant: Yanfeng International Seating Systems Co., Ltd., Shanghai (CN)

(72) Inventors: Qingwei Feng, Shanghai (CN); Jiabin Ding, Shanghai (CN); Feixiang Zhu, Shanghai (CN)

(73) Assignee: YANFENG INTERNATIONAL SEATING SYSTEMS CO., LTD., Shanghai (CN)

( * ) Notice: Subject to any disclaimer, the term of this patent is extended or adjusted under 35 U.S.C. 154(b) by 286 days.

(21) Appl. No.: 18/511,855

(22) Filed: Nov. 16, 2023

(65) Prior Publication Data

US 2024/0083307 A1     Mar. 14, 2024

Related U.S. Application Data

(63) Continuation-in-part of application No. 17/263,390, filed as application No. PCT/CN2019/086227 on May 9, 2019, now Pat. No. 11,858,382.

(30) Foreign Application Priority Data

Jul. 27, 2018     (CN) .......................... 201810847736.0
Aug. 4, 2023     (CN) .......................... 202322089986.1

(51) Int. Cl.
B60N 2/14          (2006.01)
(52) U.S. Cl.
CPC ................................... B60N 2/146 (2013.01)

(58) Field of Classification Search
CPC .................................. B60N 2/146; A47C 3/18
See application file for complete search history.

(56) References Cited

U.S. PATENT DOCUMENTS 5,482,354 A * 1/1996 Gryp ........................ A47C 3/18
297/344.22
5,733,006 A * 3/1998 Woods ..................... A47C 3/18
297/344.22

(Continued)

*Primary Examiner* — Philip F Gabler
(74) *Attorney, Agent, or Firm* — John P. White

(57) ABSTRACT

Disclosed in the utility model is a vertical latch locking mechanism for a rotating seat, including a vertical latch locking mechanism mounted on a rotating disc in a seat rotation mechanism, at least one lockhole provided on a disc surface of a fixed disc in the seat rotation mechanism, and at least one first lock pin hole provided on the rotating disc. The lockhole is aligned with the first lock pin hole, and the vertical latch locking mechanism includes: a locking pin bracket fixed on the rotating disc; and at least two lock pins vertically and moveably configured on the locking pin bracket. A first end of the lock pin passes through the first lock pin hole and is inserted into the lockhole, to implement locking. In the utility model, a horizontal locking mechanism is changed to a vertical latch mechanism, radial sizes of the rotating disc and the fixed disc are greatly reduced, and a diameter can be reduced to less than 200 mm. In addition, the vertical latch locking mechanism for a rotating seat does not extend beyond the rotating disc and can be hidden at a lower end of a cushion. The lock pin moves in an inner cavity of the rotating disc and does not scratch the outside, providing a good appearance.

19 Claims, 19 Drawing Sheets

(56) References Cited

U.S. PATENT DOCUMENTS

| | | | | |
|---|---|---|---|---|
| 6,637,712 B1 * | 10/2003 | Lagerweij | ............ | B60N 2/0887 |
| | | | | 296/64 |
| 7,108,325 B2 * | 9/2006 | Williamson | ............. | B60N 2/08 |
| | | | | 297/344.22 |
| 9,265,349 B1 * | 2/2016 | Jensen | ...................... | A47C 3/18 |
| 9,597,981 B2 * | 3/2017 | Kim | ..................... | B60N 2/0818 |
| 10,688,889 B2 * | 6/2020 | Feng | .................. | B60N 2/42736 |
| 10,857,914 B2 * | 12/2020 | Feng | ...................... | B60N 2/146 |
| 11,858,382 B2 * | 1/2024 | Feng | ........................ | A47C 3/18 |
| 2011/0240820 A1 * | 10/2011 | Napau | .................. | B60N 2/0875 |
| | | | | 248/429 |

* cited by examiner

VERTICAL LATCH LOCKING MECHANISM FOR ROTATING SEAT

CROSS-REFERENCE TO RELATED APPLICATIONS

This application: a) is a continuation-in-part of U.S. application Ser. No. 17/263,390, filed Jan. 26, 2021, now allowed, which is a § 371 national stage application claiming the benefit of PCT International Application No. PCT/CN2019/086227, filed May 9, 2019 and claims priority of Chinese Patent Application No. 201810847736.0, filed Jul. 27, 2018; and b) claims priority of Chinese Patent Application No. 202322089986.1, filed Aug. 4, 2023. The contents of each of the above applications are hereby incorporated by reference into the subject application.

TECHNICAL FIELD

The utility model relates to the technical field of seats, and in particular, to a vertical latch locking mechanism for a rotating seat.

BACKGROUND

Currently, for a rotating seat, there are mainly the following several locking mechanisms:

1. A locking mechanism implements locking by inserting a claw-shaped or tooth-shaped member in whole into a corresponding lockhole. There is a fit clearance between a contour of the claw-shaped member or the tooth-shaped member and a contour of the lockhole, which generates noise and shake in a driving process. This type of technology is mainly represented in "COMMERCIAL VEHICLE SEAT WITH LOCKING PIECE" disclosed in Chinese Patent Authorized Publication No. CN103863151B, "ROTATING DISC FOR CAR SEAT" disclosed in Chinese Patent Application No. CN106427682A, the document disclosed in Korean Application No. KR100799874B1, and "NOVEL ROTATOR MECHANISM OF ROTATING SEAT" disclosed in Chinese Patent Application No. CN102529756A.

2. A locking mechanism implements locking by inserting a cylindrical pin into a hole between a fixed disc and a rotating disc from bottom to top. Similarly, there is also a fit clearance between a single hole and a shaft, which generates noise and shake in a driving process. This type of technology is mainly represented in "SEAT ROTATION MECHA-NISM" disclosed in Chinese Patent Application No. CN104670256A and "ROTATING CAR SEAT" disclosed in Chinese Patent Authorized Publication No. CN206520509U.

The locking mechanisms in the prior art both use fitting between metal members, which generates friction-induced noise.

In the prior art, when rotating adjustment is performed, a lever needs to be pulled all the time. If the lever is released halfway, a locking member and a rotating plane generate scraping noise. In addition, two cases may occur during the rotating adjustment: One case is that the adjustment is performed by lifting the lever when sitting on a seat. The other case is that the rotating adjustment is performed outside the car, and in this case, it is quite inconvenient to pull the lever all the time.

For this reason, a seat rotation locking mechanism disclosed in Chinese Invention Patent Application No. CN108968465A includes a locking mechanism mounted on a rotating disc in a seat rotation mechanism and at least one lockhole provided on an outer circumference of a fixed disc in the seat rotation mechanism, where the locking mechanism includes: a lock support fixed on the rotating disc; and at least two lock pins horizontally and moveably configured in the lock support, where a first end of the lock pin is of a truncated-cone-shaped structure; and the first end of the lock pin is inserted into the lockhole, to implement zero-clearance locking by using wedging between the truncated-cone-shaped structure of the first end of the lock pin and the lockhole. This invention eliminates a fit clearance existing after a rotation mechanism is locked, improves a grade of a product, and improves user experience. In an adjustment process, even if an operator releases an adjustment lever, a locking piece and a fixed disc do not generate scraping noise, and service life of the product is prolonged since wearing is eliminated.

A zero-clearance locking mechanism for a rotating seat disclosed in Chinese Utility Model Patent Authorized Publication No. CN209474126U includes a locking mechanism mounted on a rotating disc in a seat rotation mechanism and at least one lockhole provided on an outer circumference of a fixed disc in the seat rotation mechanism, where the locking mechanism includes: a lock support fixed on the rotating disc; and at least two lock pins horizontally and moveably configured in the lock support, where a first end of the lock pin is of a truncated-cone-shaped structure; and the first end of the lock pin is inserted into the lockhole, to implement zero-clearance locking by using wedging between the truncated-cone-shaped structure of the first end of the lock pin and the lockhole. The utility model eliminates a fit clearance existing after a rotation mechanism is locked, improves a grade of a product, and improves user experience.

The horizontal locking mechanism in the foregoing patents CN108968465A and CN209474126U extends beyond the rotating disc body, has a large radial size, and occupies a large rotation space. In addition, because the lock pins all move horizontally, a radial size of the rotating disc is large, and an outer surface is easily scratched, affecting the appearance.

SUMMARY

A technical problem to be resolved in the utility model is to provide, for the foregoing problems in the prior art that the horizontal locking mechanism occupies a large rotation space, horizontal movement of the lock pin causes the radial size of the rotating disc to be large, and the outer surface is easily scratched to affect the appearance, a vertical latch locking mechanism for a rotating seat in which a locking mechanism is built into a rotating disc body and a lock pin moves vertically.

To achieve the foregoing invention objective, the vertical latch locking mechanism for a rotating seat according to the utility model includes a vertical latch locking mechanism mounted on a rotating disc in a seat rotation mechanism, at least one lockhole provided on a disc surface of a fixed disc in the seat rotation mechanism, and at least one first lock pin hole provided on the rotating disc, where the lockhole is aligned with the first lock pin hole, and the vertical latch locking mechanism includes:

a locking pin bracket fixed on the rotating disc; and at least two lock pins vertically and moveably configured on the locking pin bracket, where a first end of the lock pin passes through the first lock pin hole and is inserted into the lockhole, to implement locking.

In a preferred embodiment of the utility model, the first end of the lock pin is in a cone shape, to implement zero-clearance locking.

In a preferred embodiment of the utility model, there are two lock pins and two first lock pin holes, where the lockhole is a waist-shaped hole; and the two lock pins are arranged in parallel and respectively pass through the two first lock pin holes and are inserted into the lockholes for locking.

In a preferred embodiment of the utility model, the locking pin bracket includes one top surface and four side surfaces, where the four side surfaces are respectively a first side surface, a second side surface, a third side surface, and a fourth side surface, the first side surface and the second side surface are formed by downward bending of a first side and a second side of the top surface and are symmetrically located on the first side and the second side of the top surface, and the third side surface and the fourth side surface are formed by forward bending of two sides of the second side surface and are welded to the first side surface; and two second lock pin holes are provided on the top surface, for second ends of the two lock pins to pass through.

In a preferred embodiment of the utility model, a locking pin silencing bushing is mounted inside each second lock pin hole, and the second ends of the two lock pins pass through the locking pin silencing bushings.

In a preferred embodiment of the utility model, the vertical latch locking mechanism further includes:

an unlock bracket hinged on the locking pin bracket, where the unlock bracket is drivingly connected to the lock pins, to drive the lock pins for unlocking.

In a preferred embodiment of the utility model, the unlock bracket is hinged on the locking pin bracket by using an unlock lever dowel pin.

In a preferred embodiment of the utility model, two first hinge lugs are symmetrically disposed on the unlock bracket, a first hinge hole is provided in each first hinge lug, a dowel pin bushing is mounted in each first hinge hole, and two ends of the unlock lever dowel pin respectively pass through two dowel pin bushings.

In a preferred embodiment of the utility model, two second lock lugs are symmetrically disposed on the first side surface of the locking pin bracket, a second hinge hole is provided in each second lock lug, and the two ends of the unlock lever dowel pin respectively pass through the second hinge holes and are anchored.

In a preferred embodiment of the utility model, a dowel pin bushing is mounted in each second hinge hole, and second ends of the two ends of the unlock lever dowel pin pass through the dowel pin bushings.

In a preferred embodiment of the utility model, an unlocking portion is disposed on the unlock bracket, two lock pin notches are provided side by side on the unlocking portion, and a convex ring is disposed at a middle position of each lock pin, where the unlocking portion is inserted into the locking pin bracket from a bottom of the first side surface of the locking pin bracket, the two lock pin notches on the unlocking portion each snap into a position below a convex ring on a corresponding lock pin and enable an upper surface of the unlocking portion to be in contact with a lower surface of the convex ring, and the unlock bracket drives, by using the convex ring, the lock pin to move upward to unlock.

In a preferred embodiment of the utility model, a lock pin return spring is sleeved over the second end of each lock pin, where a lower end of the lock pin return spring abuts against the convex ring, and an upper end of the lock pin return spring abuts against the top surface of the locking pin bracket.

In a preferred embodiment of the utility model, the vertical latch locking mechanism further includes a lock mounting bracket, where the lock mounting bracket is mounted on the rotating disc by using a fastener, and bottoms of the first side surface, the second side surface, the third side surface, and the fourth side surface of the locking pin bracket are welded to the lock mounting bracket; a gap is left between the bottom of the first side surface and the upper surface of the lock mounting bracket, and the unlocking portion is inserted into the locking pin bracket from the gap; and two third lock pin holes are provided side by side on the lock mounting bracket, the two third lock pin holes are aligned one by one with two first lock pin holes on the rotating disc, and the first end of the lock pin passes through the third lock pin hole and the second lock pin hole.

In a preferred embodiment of the utility model, an unlocking operating portion is disposed on the unlock bracket; and the unlocking operating portion is operated to drive the unlock bracket to rotate, to implement unlocking.

In a preferred embodiment of the utility model, when the vertical latch locking mechanism is mounted on the rotating disc, mounting can be performed with the unlocking operating portion facing the outside of the rotating disc or with the unlocking operating portion facing the inside of the rotating disc.

In a preferred embodiment of the utility model, an unlock cable hanger lug is disposed on the unlocking operating portion, and an end of an unlock cable is connected to the unlock cable hanger lug.

In a preferred embodiment of the utility model, an unlock pin is mounted on the unlocking operating portion and the unlocking operating portion further includes an unlock lever, where the unlock lever is hinged on the rotating disc; an unlock slot is provided on the unlock lever, where the unlock slot comprises an arc-shaped slot edge; the unlock pin is inserted into the unlock slot and is in contact with the arc-shaped slot edge; and when the unlock lever is rotated, the unlock lever drives, by using the arc-shaped slot edge, the unlock pin to move, to drive the unlock bracket to unlock.

In a preferred embodiment of the utility model, climbing slopes are respectively disposed on two sides of the lockhole that is along a rotation direction of the rotating disc and that is on the disc surface of the fixed disc, and the lockhole is located at a highest position of the climbing slope.

Due to adoption of the foregoing technical solutions, in the utility model, a horizontal locking mechanism is changed to a vertical latch mechanism, radial sizes of the rotating disc and the fixed disc are reduced, and a diameter can be reduced by approximately 200 mm. In addition, the vertical latch locking mechanism for a rotating seat does not extend beyond the rotating disc and can be hidden at a lower end of a cushion. The lock pin moves in an inner cavity of the rotating disc and does not scratch an outer surface, providing a good appearance.

5

Figure 3:
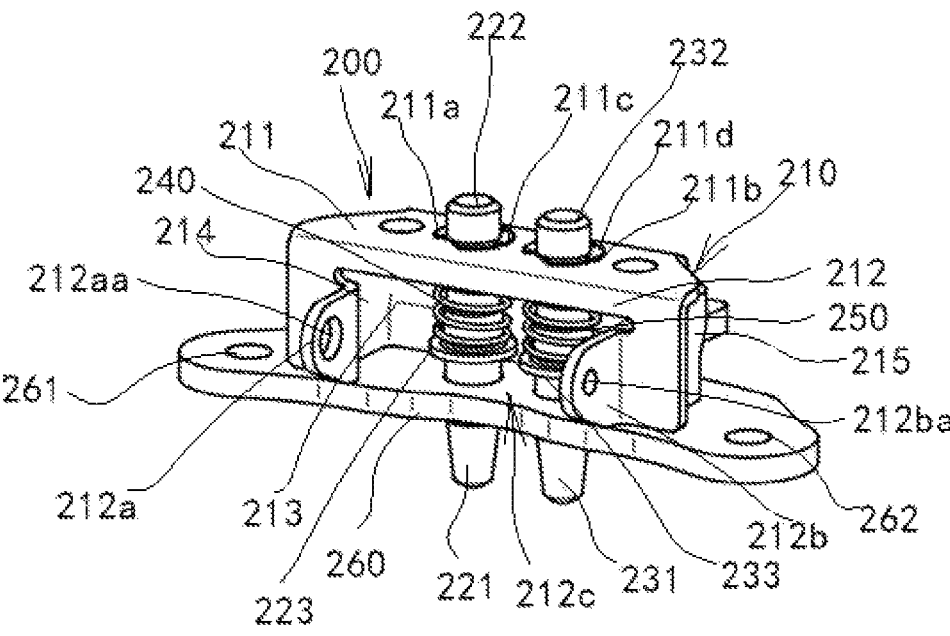

FIG. 3 is a schematic structural diagram of a vertical latch locking mechanism in a vertical latch locking mechanism for a rotating seat according to Embodiment 1 of the utility model.

Figure 4:
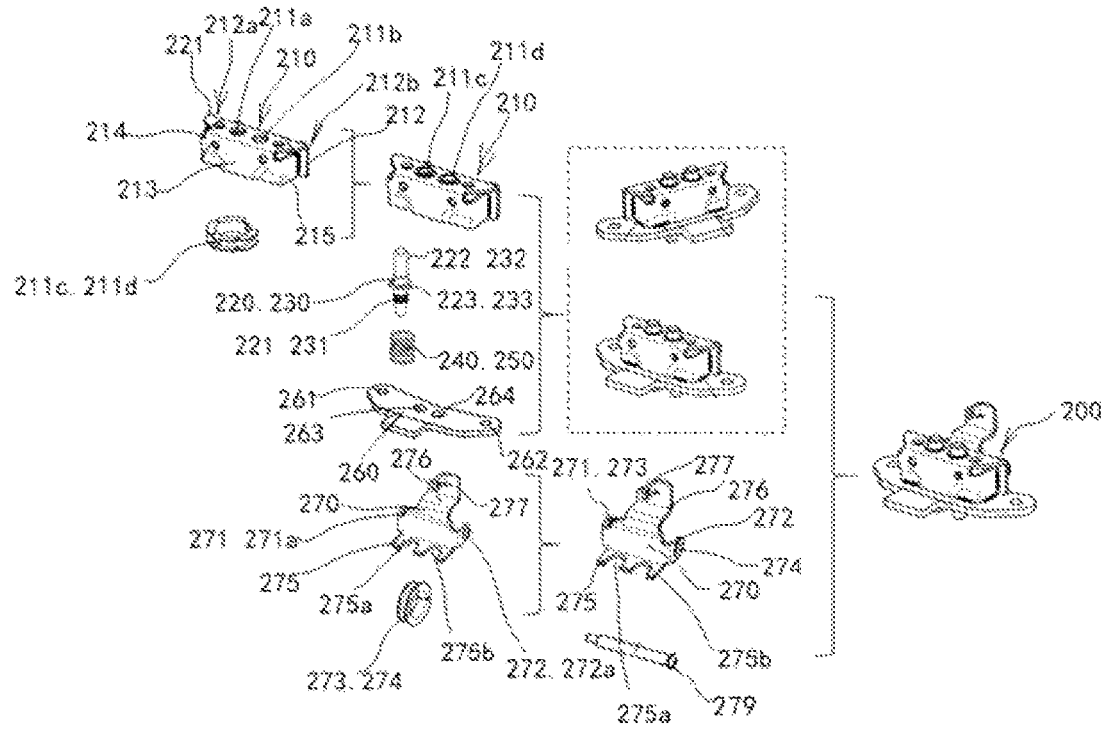

FIG. 4 is a schematic diagram of an assembly procedure of a vertical latch locking mechanism for a rotating seat according to Embodiment 1 of the utility model.

Figure 5:
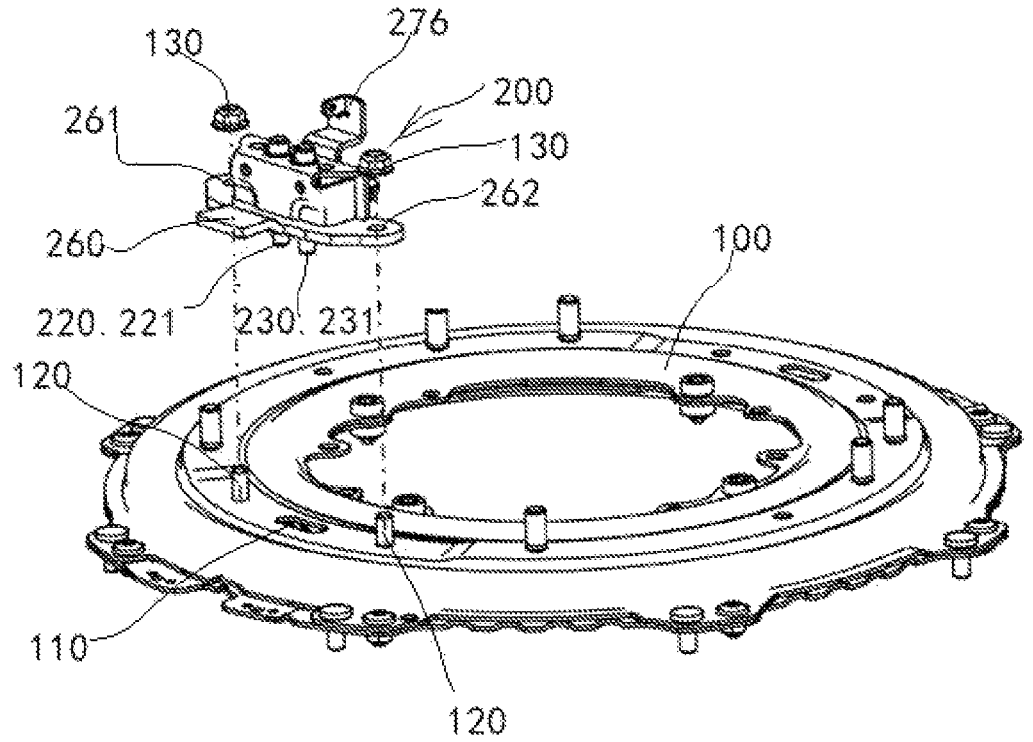

FIG. 5 is a schematic diagram of a process of mounting a vertical latch locking mechanism for a rotating seat on a rotating disc in a first mounting manner in the utility model.

Figure 6:
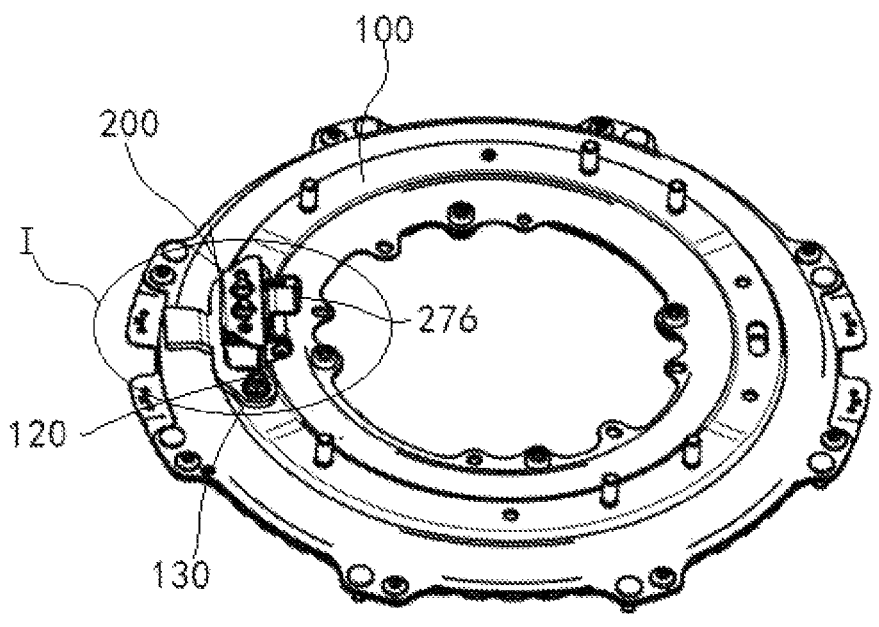

FIG. 6 is a schematic diagram of a vertical latch locking mechanism for a rotating seat mounted on a rotating disc in a first mounting manner according to Embodiment 1 of the utility model.

Figure 7:
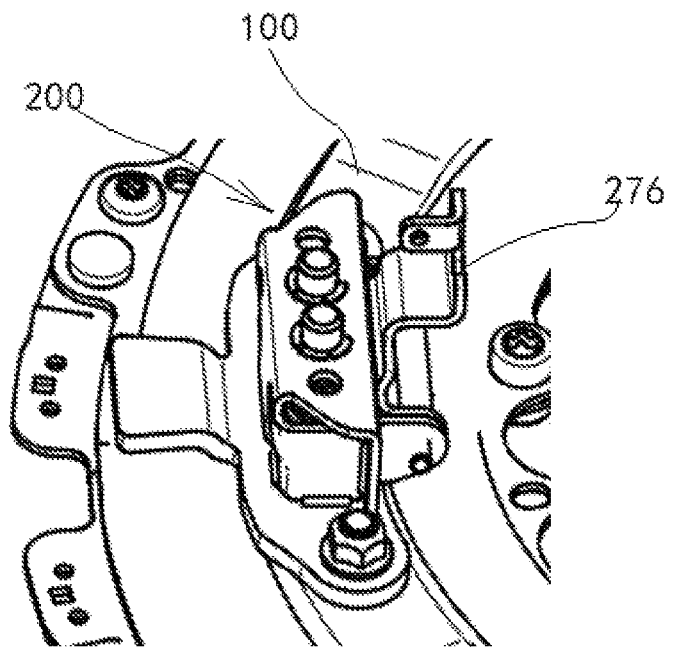

FIG. 7 is a schematic enlarged view of part I in FIG. 6.

Figure 8:
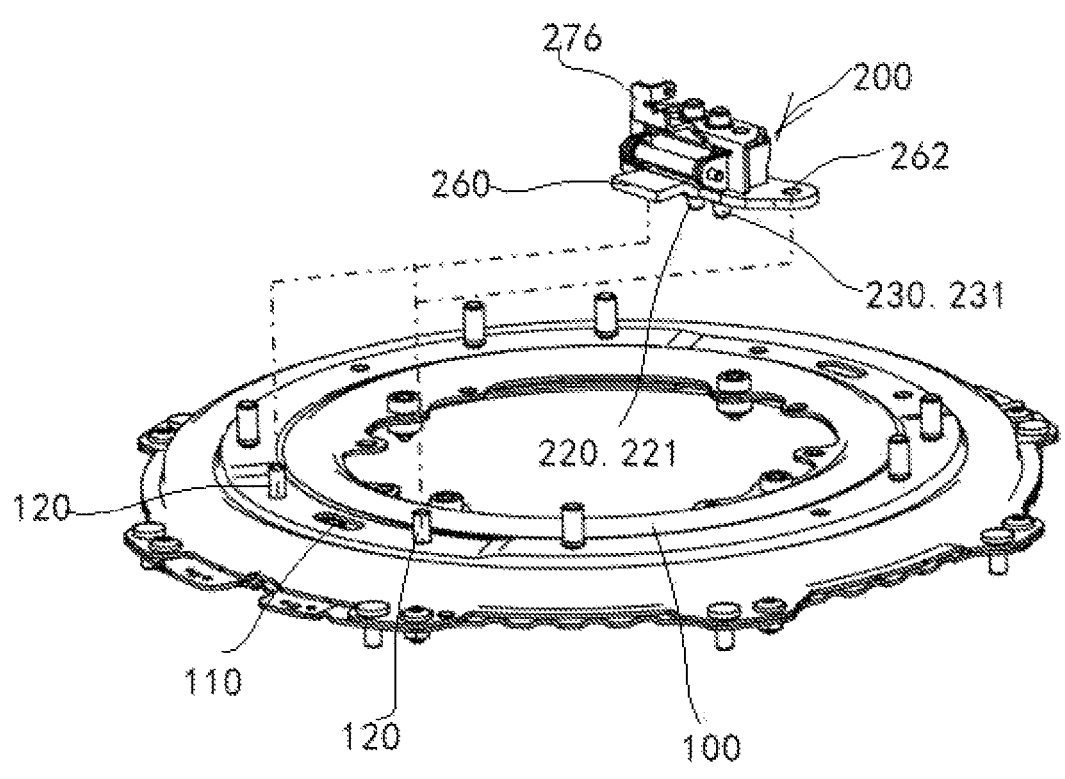

FIG. 8 is a schematic diagram of a process of mounting a vertical latch locking mechanism for a rotating seat on a rotating disc in a second mounting manner according to Embodiment 1 of the utility model.

Figure 9:
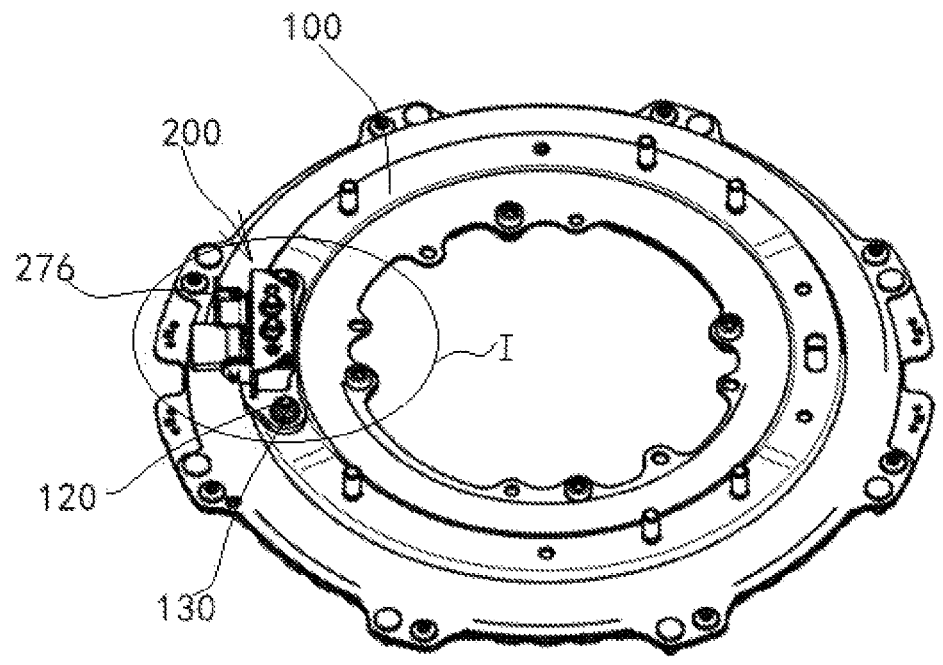

FIG. 9 is a schematic diagram of a vertical latch locking mechanism for a rotating seat mounted on a rotating disc in a second mounting manner according to Embodiment 1 of the utility model.

Figure 10:
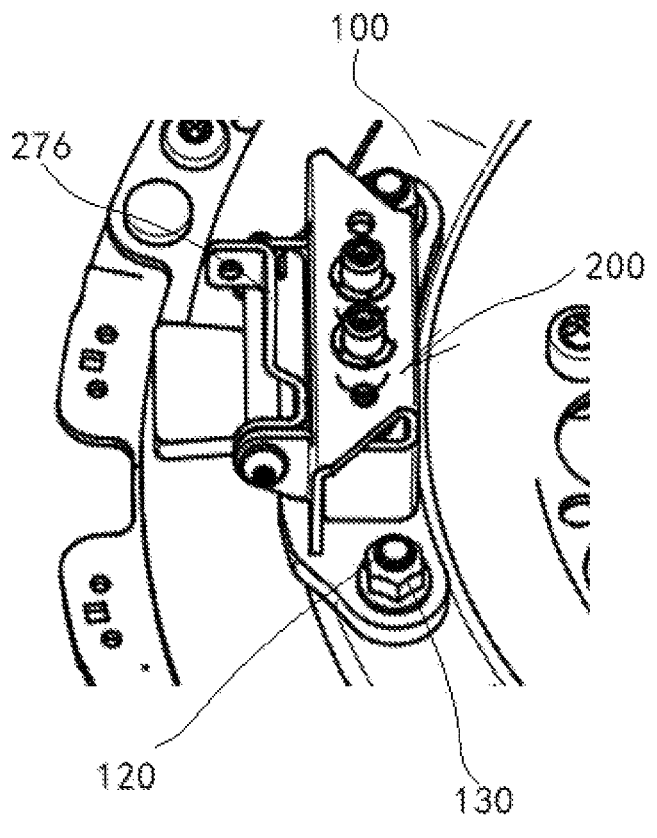
Figure 11A:
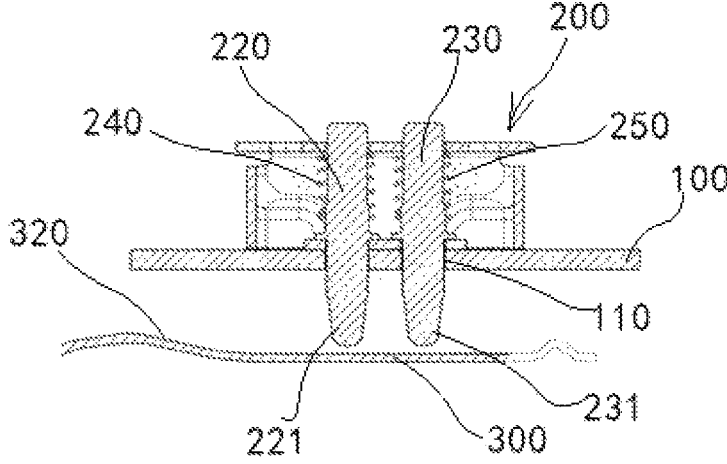
Figure 11B:
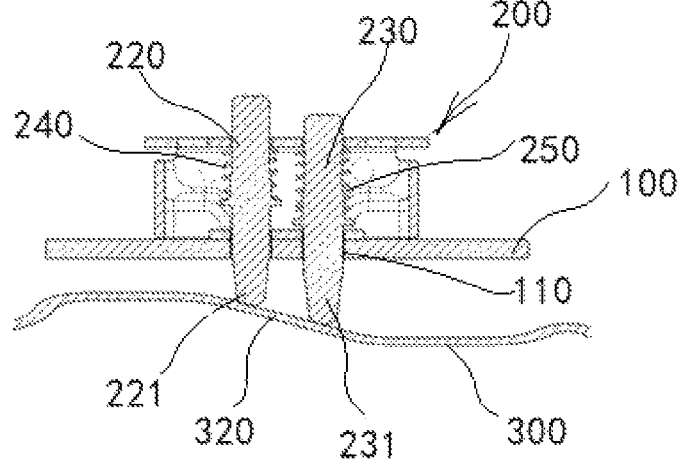
Figure 11C:
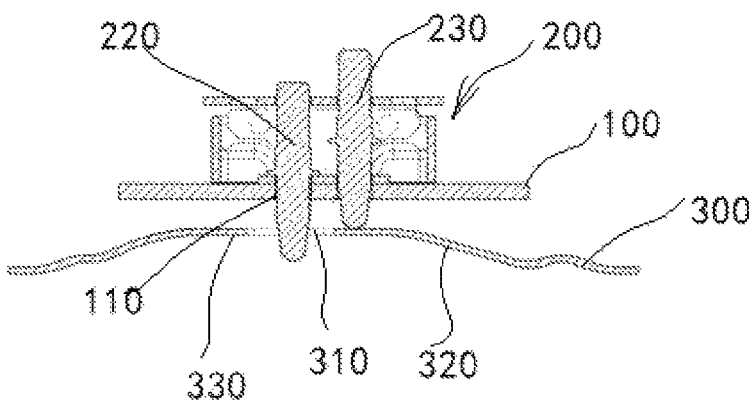
Figure 11D:
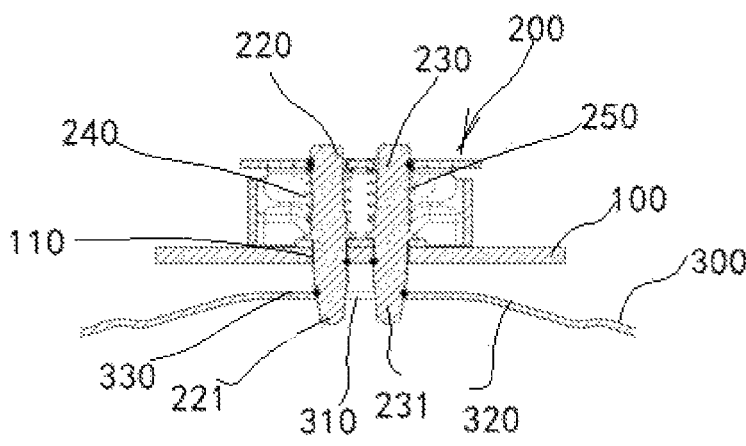
Figure 12A:
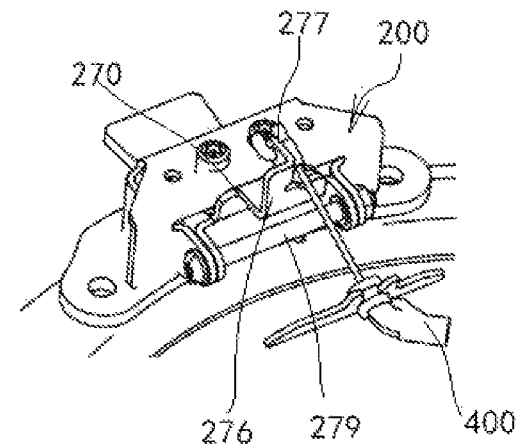
Figure 12B:
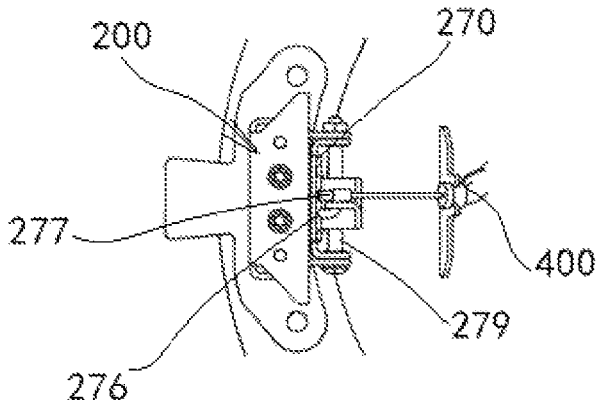
Figure 12C:
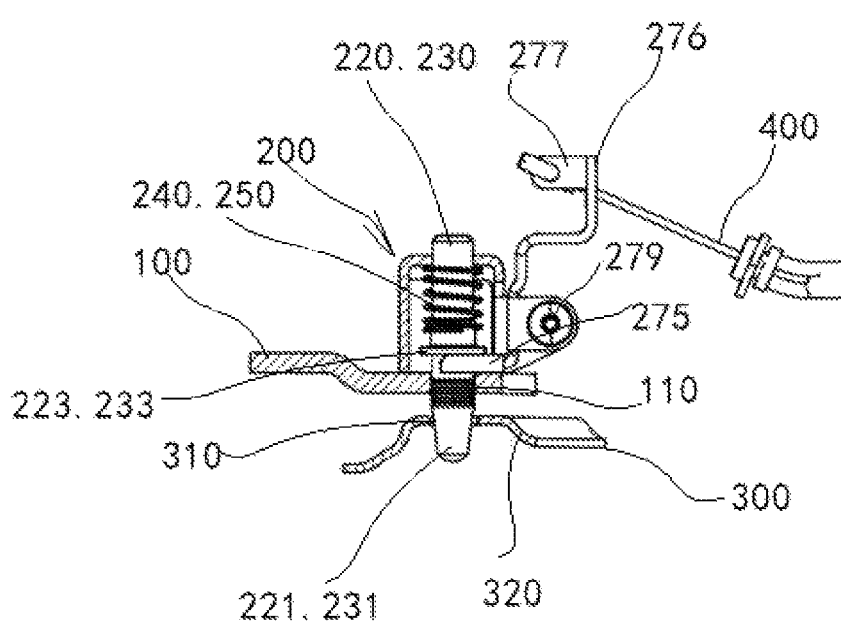
Figure 12D:
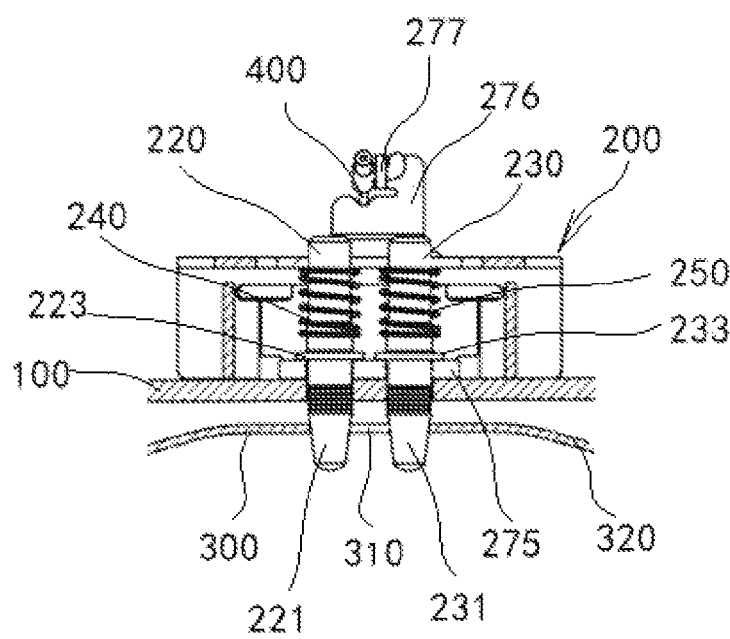
Figure 12E:
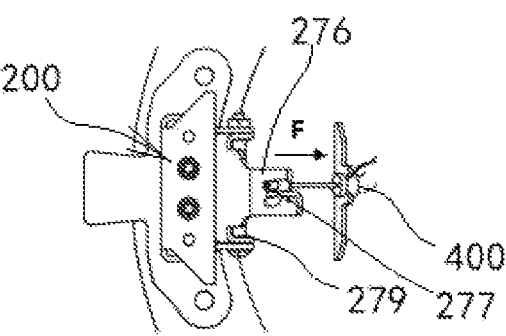
Figure 12F:
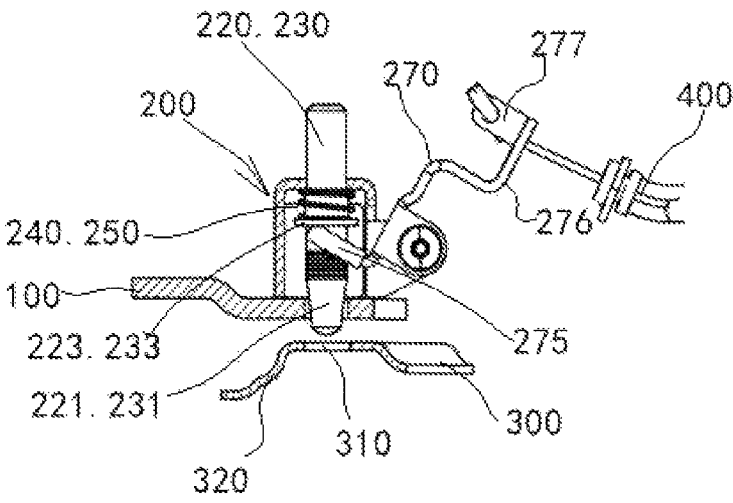
Figure 12G:
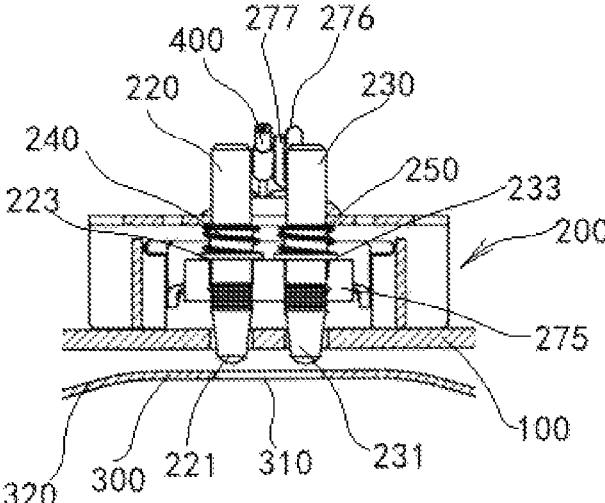

FIG. 10 is a schematic enlarged view of part I in FIG. 8.

FIG. 11a to FIG. 11d are schematic diagrams of a locking process of a lock pin according to Embodiment 1 of the utility model.

FIG. 12a to FIG. 12g are schematic diagrams of a conversion process between locking and unlocking of a vertical latch locking mechanism for a rotating seat according to Embodiment 1 of the utility model.

Figure 13:
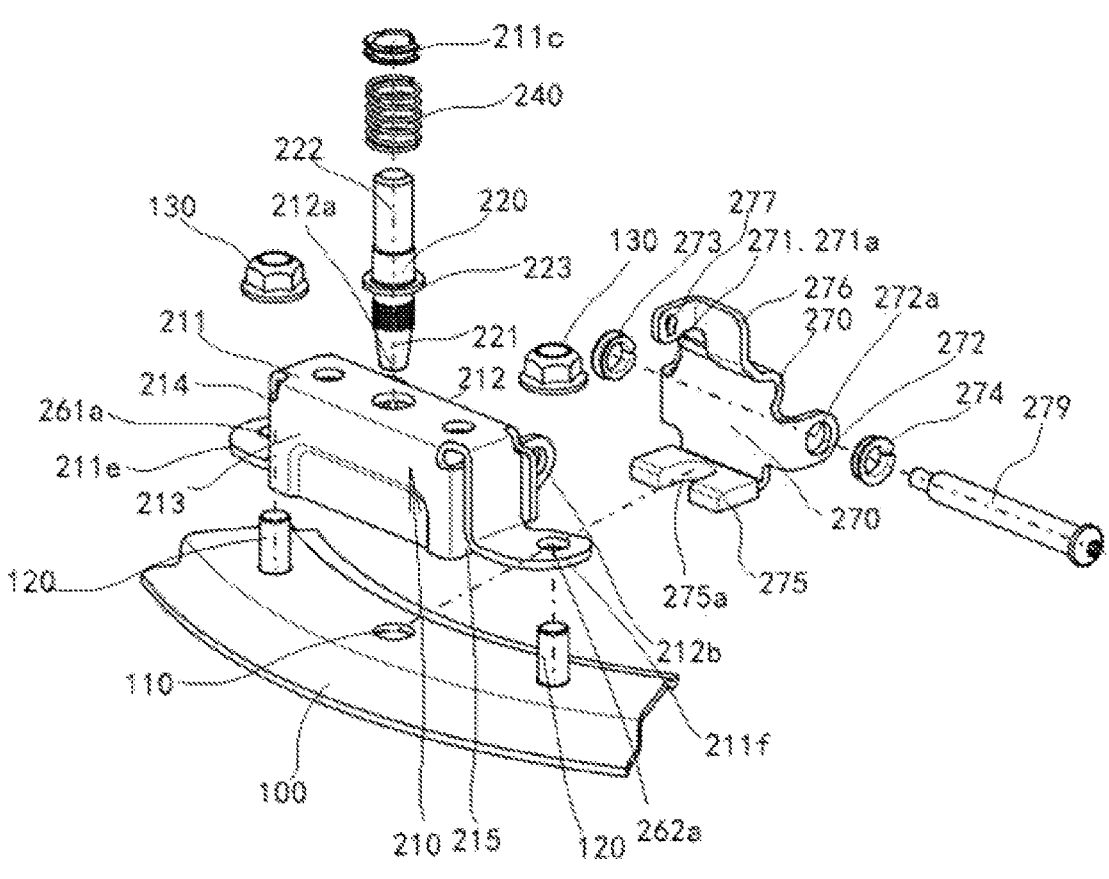

FIG. 13 is a schematic structural diagram of a vertical latch locking mechanism for a rotating seat according to Embodiment 2 of the utility model.

Figure 14:
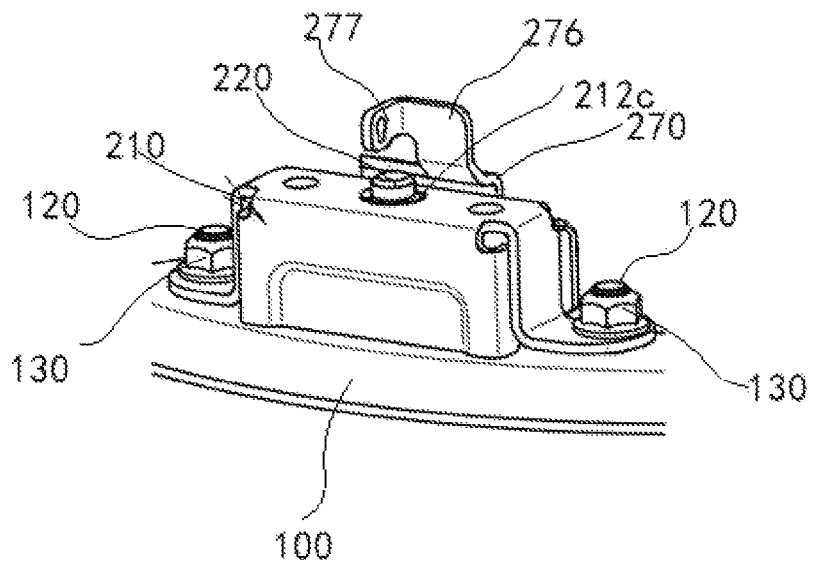
Figure 15A:
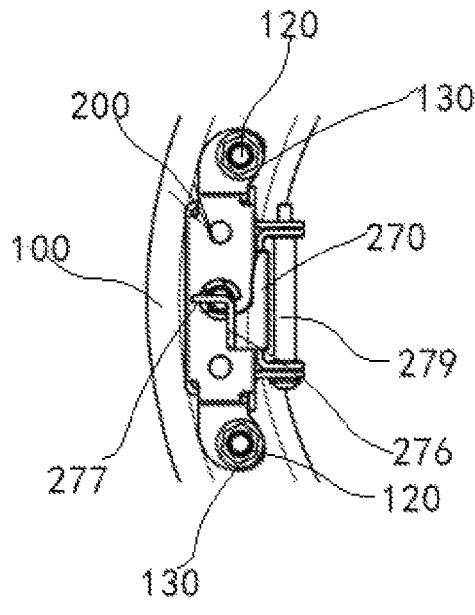
Figure 15B:
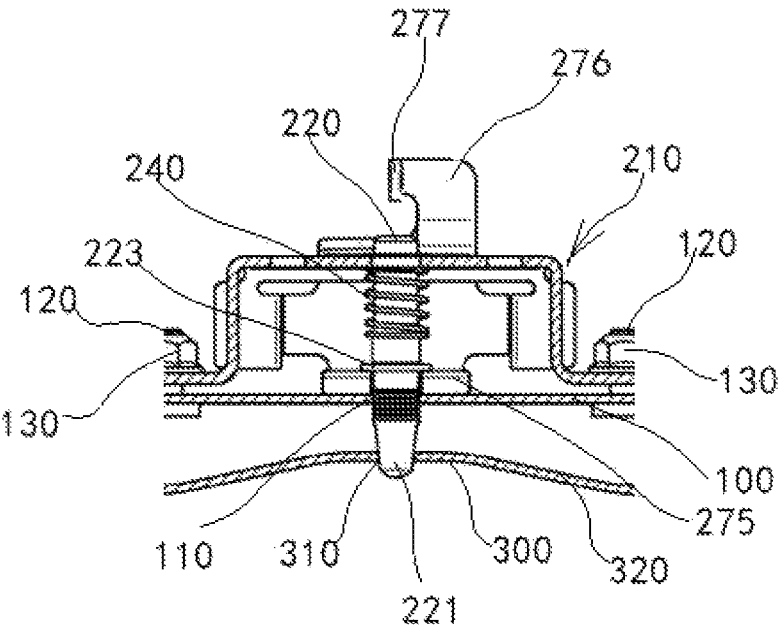
Figure 15C:
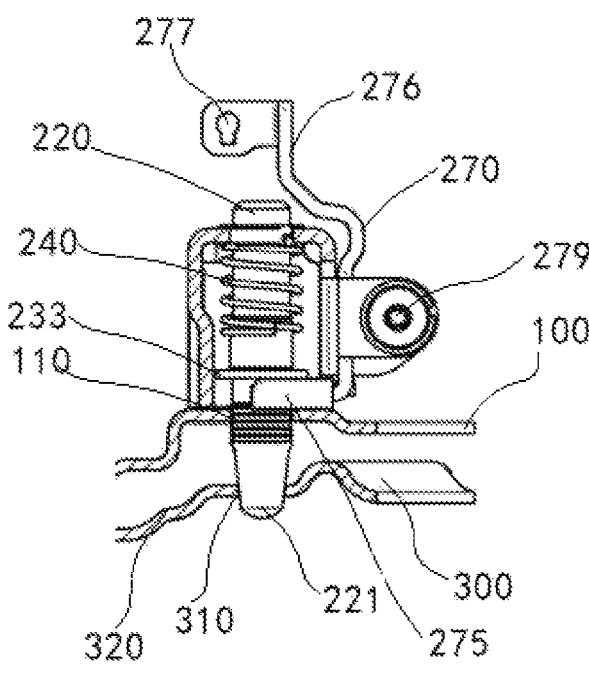
Figure 15D:
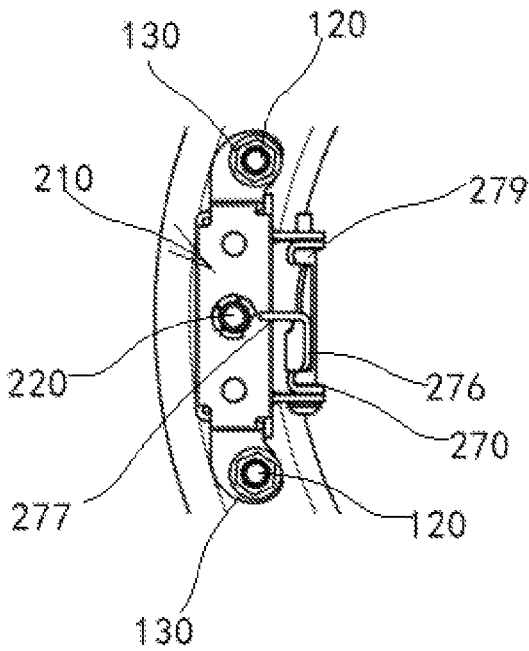
Figure 15E:
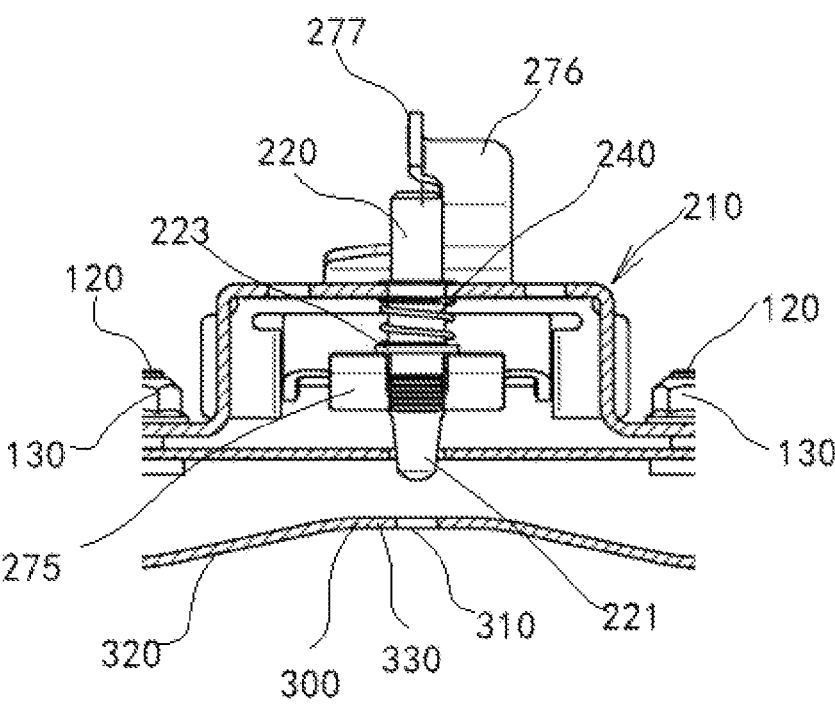
Figure 15F:
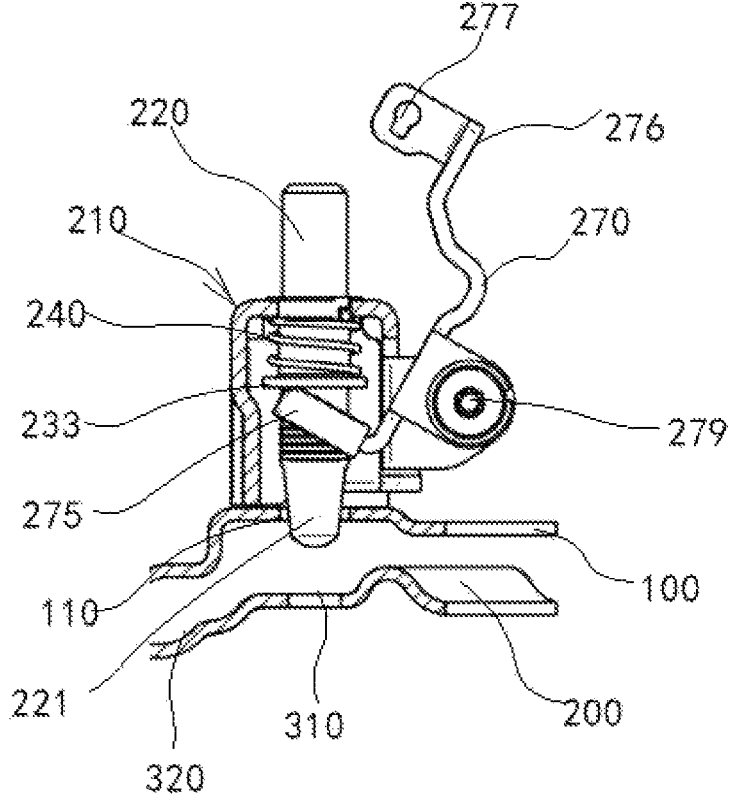
Figure 16A:
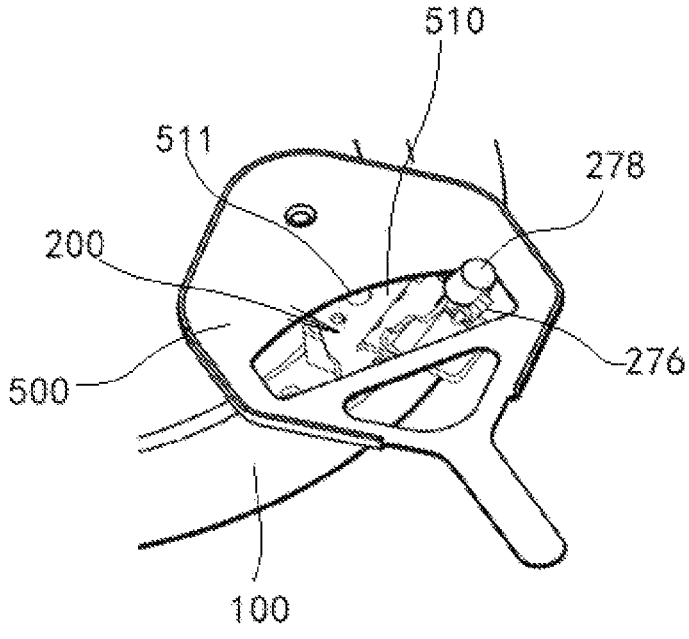
Figure 16B:
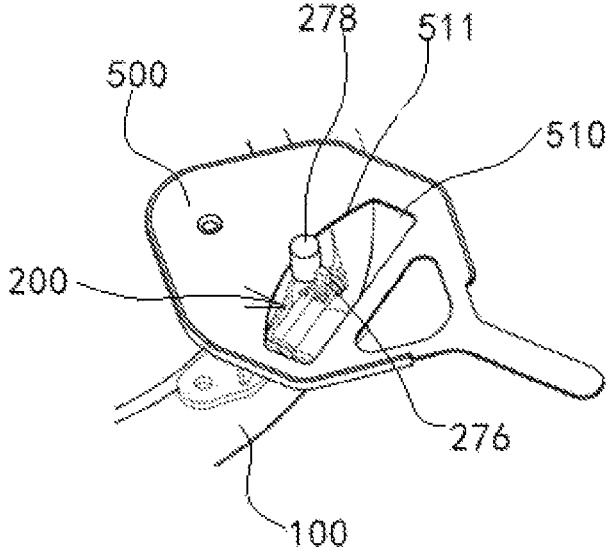
Figure 16C:
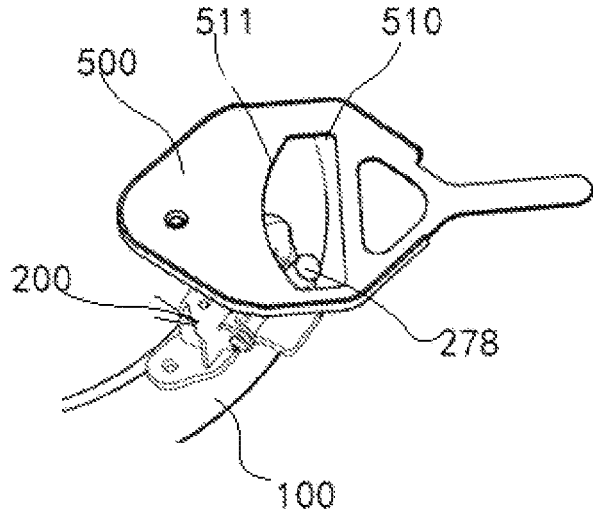
Figure 16D:
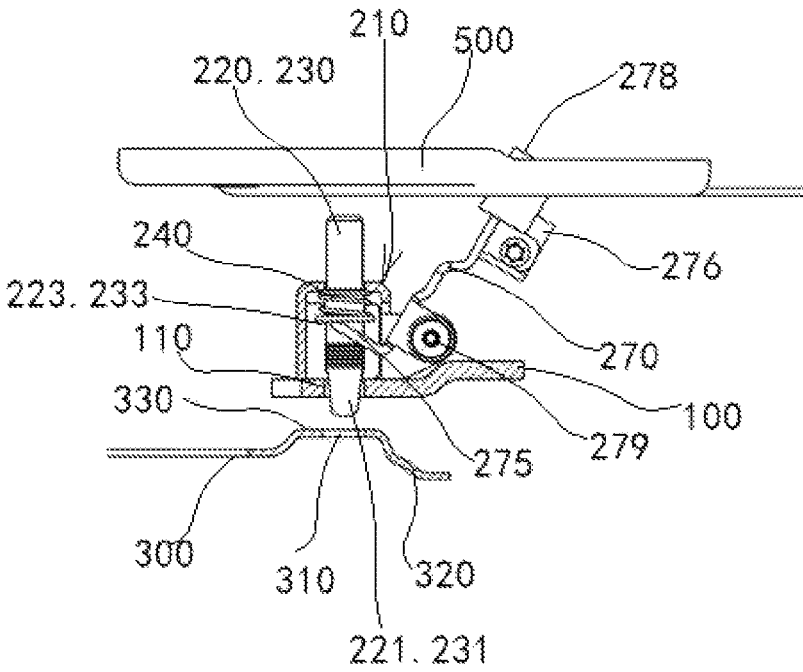
Figure 16E:
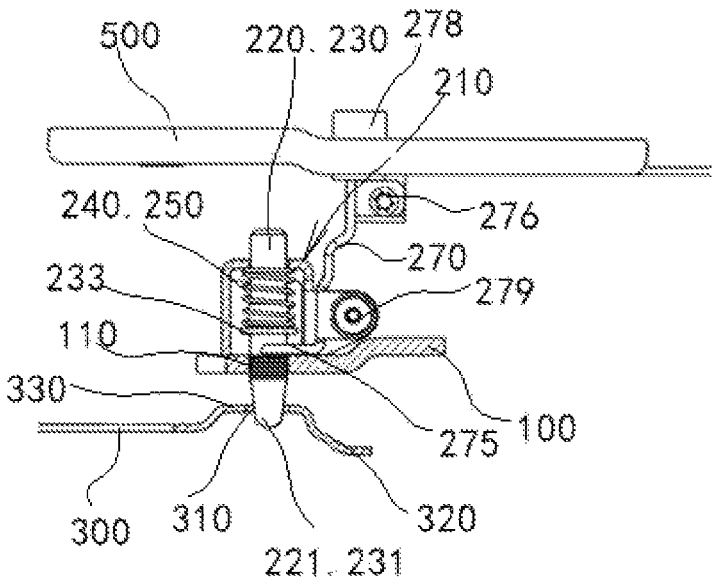
Figure 16F:
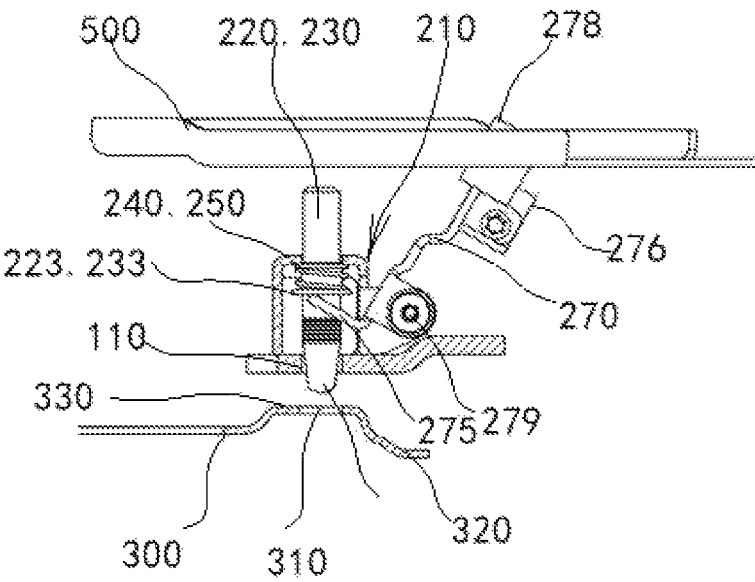
Figure 16G:
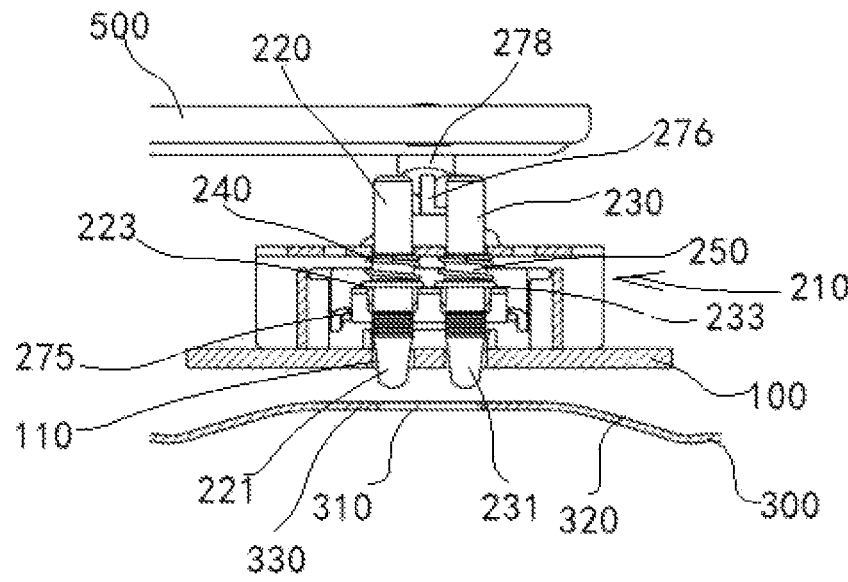
Figure 16H:
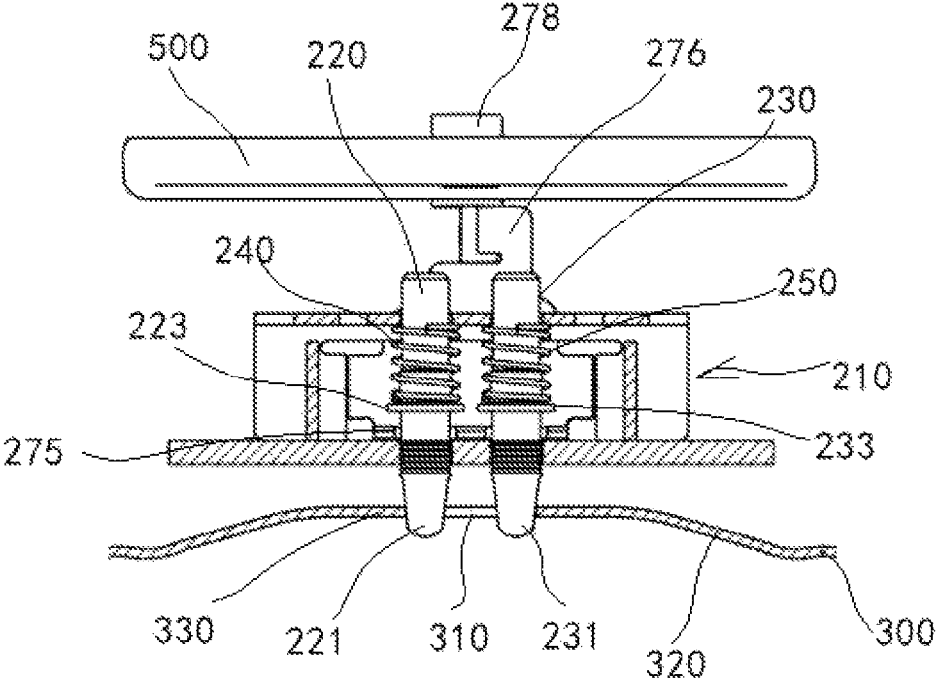
Figure 16I:
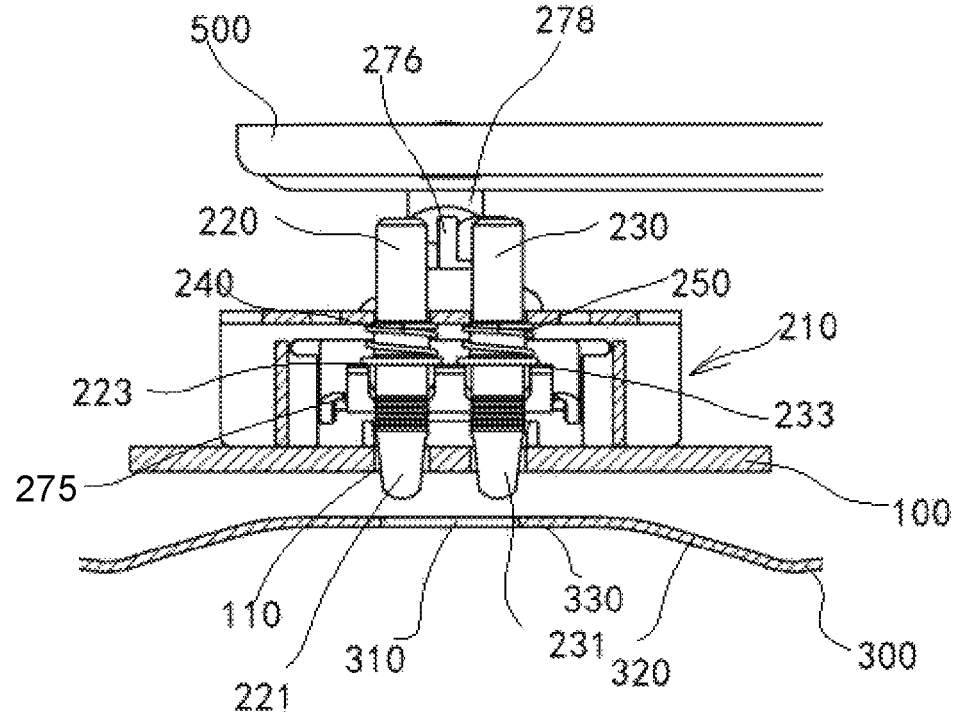

FIG. 14 is a schematic exploded view of a vertical latch locking mechanism for a rotating seat according to Embodiment 2 of the utility model.

FIG. 15a to FIG. 15f are schematic diagrams of a conversion process between locking and unlocking of a vertical latch locking mechanism for a rotating seat according to Embodiment 2 of the utility model.

FIG. 16a to FIG. 16i are schematic diagrams of a conversion process between locking and unlocking of a vertical latch locking mechanism for a rotating seat according to Embodiment 3 of the utility model.

DETAILED DESCRIPTION

The utility model is further described below with reference to the accompanying drawings and specific embodiments.

Embodiment 1

Figure 1:
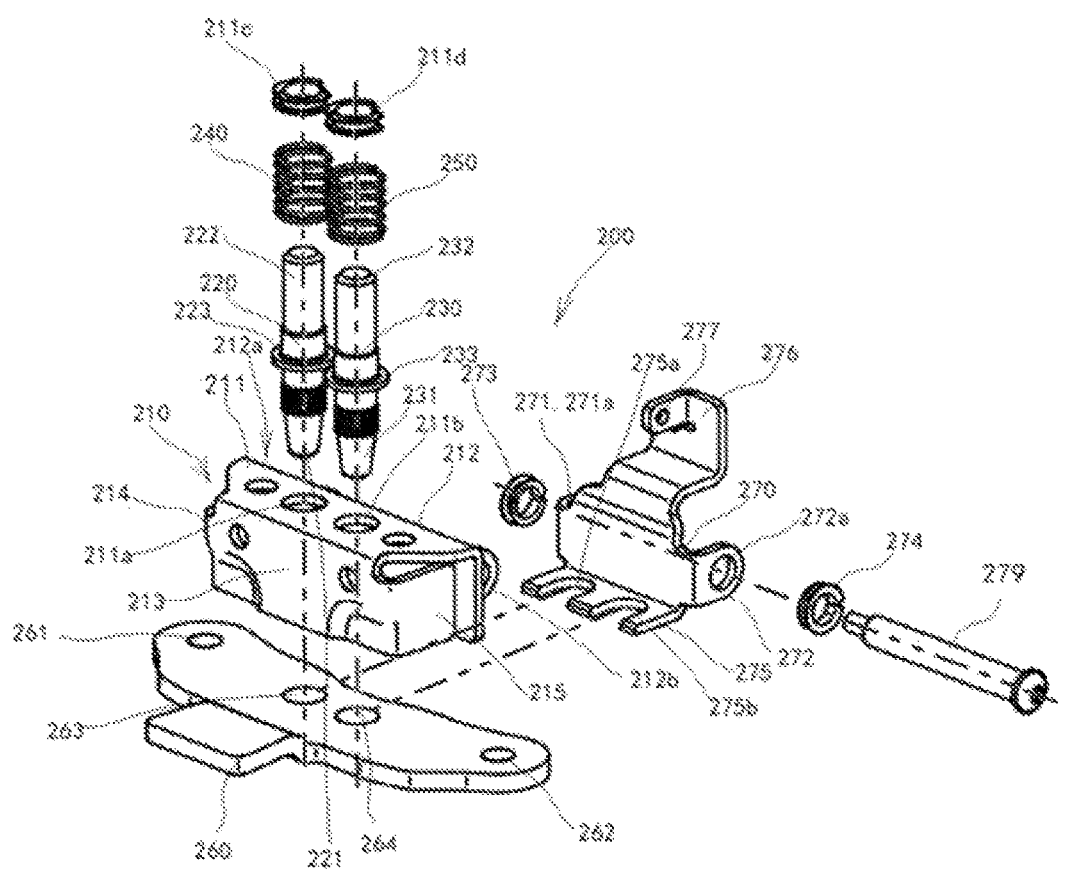
FIG. 1 is a schematic exploded view of a vertical latch locking mechanism for a rotating seat according to Embodiment 1 of the utility model.
Figure 2:
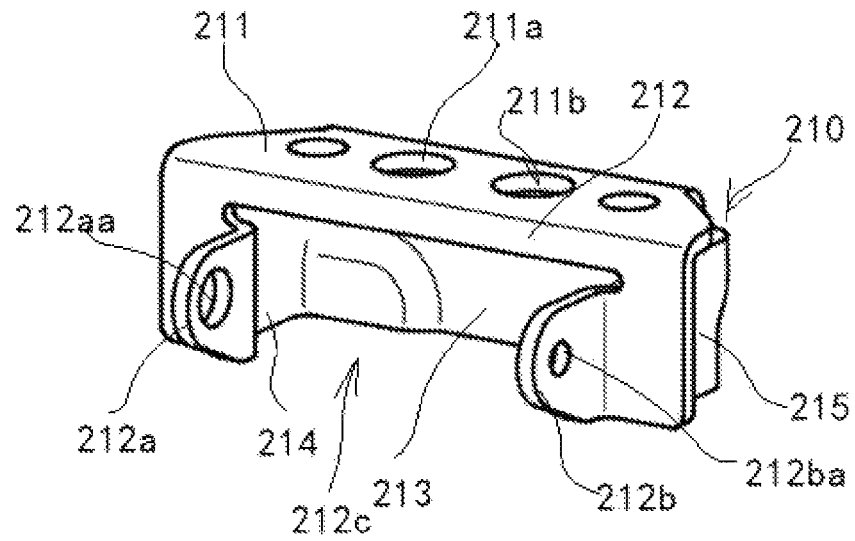
FIG. 2 is a schematic structural diagram of a locking pin bracket in a vertical latch locking mechanism for a rotating seat according to Embodiment 1 of the utility model.

Refer to FIG. 1 to FIG. 3. A vertical latch locking mechanism for a rotating seat shown in the figures includes a vertical latch locking mechanism 200 mounted on a rotating disc 100 in a seat rotation mechanism, a lockhole 310 provided on a disc surface of a fixed disc 300 in the seat rotation mechanism, and two lock pin holes 110 (the foregoing first lock pin holes) provided side-by-side on the rotating disc 100. The lockhole 310 is a waist-shaped hole and is aligned with the two lock pin holes 110.

Climbing slopes 320 and top slopes 330 are respectively disposed on two sides of the lockhole 310 that is along a rotation direction of the rotating disc 100 and that is on the disc surface of the fixed disc 300, and the lockhole 310 is located at a highest position of the climbing slopes 320 and the top slopes 330.

The vertical latch locking mechanism 200 includes a locking pin bracket 210, two locking pins 220 and 230, two lock pin return springs 240 and 250, a lock mounting bracket 260, and an unlock bracket 270.

The locking pin bracket 210 includes a top surface 211 and four side surfaces 212 (the foregoing first side surface), 213 (the foregoing second side surface), 214 (the foregoing third side surface), and 215 (the foregoing fourth side surface), the side surface 212 and the side surface 213 are formed by downward bending of two sides of the top surface 211 and are symmetrically located on the two sides of the top surface 211, and the side surface 214 and the side surface 215 are formed by forward bending of two sides of the side surface 213 and are welded to the side surface 212. Two second lock pin holes 211a and 211b are provided on the top surface 211, for second ends 222 and 232 of the two lock pins 220 and 230 to pass through. Locking pin silencing bushings 211c and 211d are mounted inside the lock pin holes 211a and 211b.

Two second lock lugs 212a and 212b (the foregoing second lock lugs) are symmetrically disposed on the side surface 212 of the locking pin bracket 210, a hinge hole 212aa and 212ba are provided in the lock lugs 212a and 212b.

Bolt holes 261 and 262 are respectively provided at two ends of the lock mounting bracket 260, and two lock pin holes 263 and 264 (the foregoing third lock pin holes) are provided side by side at a middle position of the lock mounting bracket 260.

Two hinge lugs 271 and 272 (the foregoing first hinge lugs) are symmetrically disposed on the unlock bracket 270, a hinge hole 271a or 272a (the foregoing first hinge hole) is provided in each hinge lug 271 or 272, and a dowel pin bushing 273 or 274 is mounted in each hinge hole 271a or 272a.

An unlocking portion 275 is disposed on the unlock bracket 270, two lock pin notches 275a and 275b are provided side by side on the unlocking portion 275. In addition, an unlocking operating portion 276 is disposed on the unlock bracket 270.

First ends 221 and 231 of the two lock pins 220 and 230 each are in a cone shape, to implement zero-clearance locking. A convex ring 223 or 233 is disposed at a middle position of each lock pin 220 or 230.

During assembly, the lock pin return springs 240 and 250 are first respectively sleeved over the second ends 222 and 232 of the two lock pins 220 and 230, and then the second ends 222 and 232 of the two lock pins 220 and 230 respectively pass through locking pin silencing bushings 211c and 211d from bottom to top. In this case, lower ends of the lock pin return springs 240 and 250 respectively abut against the convex rings 223 and 233 of the two lock pins 220 and 230, and upper ends of the lock pin return springs abut against the top surface 211 of the locking pin bracket 210.

Then, the two lock pin holes 263 and 264 of the lock mounting bracket 260 are respectively sleeved over the first ends 221 and 231 of the two lock pins 220 and 230, so that the two lock pin holes 263 and 264 of the lock mounting bracket 260 are aligned one by one with two first lock pin holes 211a and 211b on the top surface 211 of the locking pin bracket 210. Then, bottoms of the side surfaces 212, 213, 214, and 215 of the locking pin bracket 210 are welded to an upper surface of the lock mounting bracket 260, and a gap 212c is left between the bottom of the side surface 212 of the locking pin bracket 210 and the upper surface of the lock mounting bracket 260.

Then, the unlocking portion 275 of the unlock bracket 270 is inserted into the locking pin bracket 210 from the gap between the bottom of the side surface 212 of the locking pin bracket 210 and the upper surface of the lock mounting bracket 260, so that the two lock pin notches 275a and 275b on the unlocking portion 275 each snap into a position below the convex ring 223 or 233 on the corresponding lock pin 220 or 230 and enable an upper surface of the unlocking portion 275 to be in contact with a lower surface of the convex ring 223 or 233, so that the unlock bracket 270 and the two lock pins 220 and 230 are drivingly connected, and drive the lock pins 220 and 230 for unlocking.

The two hinge lugs 271 and 272 of the unlock bracket 270 are simultaneously inserted between the two lock lugs 212a and 212b on the side surface 212 of the locking pin bracket 210, so that the hinge holes 271a and 272a on the two hinge lugs 271 and 272 are aligned one by one with the two lock lugs 212a and 212b on the side surface 212 of the locking pin bracket 210.

Then, an unlock lever dowel pin 279 sequentially passes through the hinge hole on the lock lug 212a on the side surface 212 of the locking pin bracket 210, the hinge hole 271a on the hinge lug 271 of the unlock bracket 270, the dowel pin bushings 273 and 274, the hinge hole 272a on the hinge lug 272 of the unlock bracket 270, and the hinge hole on the lock lug 212b on the side surface 212 of the locking pin bracket 210, and then two ends of the unlock lever dowel pin 279 are anchored to the lock lugs 212a and 212b on the side surface 212 of the locking pin bracket 210, so that the unlock bracket 270 is hinged on the locking pin bracket 210.

Because the two lock pins 220 and 230 are vertically and moveably configured on the locking pin bracket 210, the unlock bracket 270 can be driven to flip around the unlock lever dowel pin 279 by operating the unlocking operating portion 276. When the unlocking operating portion 276 is operated to flip, the unlocking portion 275 drives, by using the convex rings 223 and 233 on the lock pins 220 and 230, the lock pins 220 and 230 to move upward, and the lock pin return springs 240 and 250 are compressed by force, to implement unlocking. The unlocking operating portion 276 is released, and the lock pins 220 and 230 move downward to be reset when the two lock pin return springs 240 and 250 are released from force constraints. The unlock bracket 270 is simultaneously driven, by using the convex rings 223 and 233 on the lock pins 220 and 230 and the unlocking portion 275, to be reset.

Refer to FIG. 4 to FIG. 10. The foregoing vertical latch locking mechanism 200 is mounted on the rotating disc 100 in the following manner. Two bolts 120 are anchored on the rotating disc 100, the bolt holes 261 and 262 at the two ends of the lock mounting bracket 260 are sleeved over the two bolts 120 and enable the two lock pin holes 263 and 264 on the lock mounting bracket 260 to be aligned one by one with the lock pin holes 110 on the rotating disc 100, the first ends 221 and 231 of the two lock pins 220 and 230 pass through the lock pin holes 110 on the rotating disc 100, and finally just a nut 130 is used for locking.

When the vertical latch locking mechanism 200 is mounted on the rotating disc 100, mounting can be performed with the unlocking operating portion 276 shown in FIG. 3 to FIG. 5 facing the inside of the rotating disc 100 or with the unlocking operating portion 276 shown in FIG. 8 to FIG. 10 facing the outside of the rotating disc 100.

Refer to FIG. 1 to FIG. 10 and FIG. 12a to FIG. 12g. An unlock cable hanger lug 277 is disposed on the unlocking operating portion 276, and an end of an unlock cable 400 is connected to the unlock cable hanger lug 277. In this way, the unlock bracket 270 may be driven, by using just the unlock cable 400, to flip to implement unlocking.

Refer to FIG. 12a to FIG. 12g. The following is an unlocking process of the foregoing vertical latch locking mechanism 200.

The unlock cable 400 drives the unlock bracket 270 to flip around the unlock lever dowel pin 279, and the unlocking portion 275 drives, by using the convex rings 223 and 233 on the lock pins 220 and 230, the lock pins 220 and 230 to move upward, to exit the lockhole 310 and implement unlocking.

Refer to FIG. 11a to FIG. 11d, when the foregoing vertical latch locking mechanism 200 follows the rotating disc 100 to rotate to a ready locking position, the first ends 221 and 231 of the two lock pins 220 and 230 encounter the climbing slope 320 of the fixed disc 300, and the climbing slope 320 pushes the two lock pins 220 and 230 to move upward. In this case, the lock pin return springs 240 and 250 are compressed by force. When the two lock pins 220 and 230 reach a position of the top slope 330 and the lockhole 310, because the top slope 330 loses support for the two lock pins 220 and 230, the two lock pins 220 and 230 move downward under a return action of the lock pin return springs 240 and 250 and are inserted into the lockhole 310 for locking.

Embodiment 2

A difference between this embodiment and Embodiment 1 is that: referring to FIG. 13, FIG. 14, and FIG. 15a to FIG. 15f, there is one lock pin, namely a lock pin 220, only a lock pin hole 211a is provided on the top surface 211 of the locking pin bracket 210, and also, only one lock pin notch 275a is provided on the unlocking portion 275 of the unlock bracket 270. Additionally, only one lock pin hole 110 is provided on the rotating disc 100, a lockhole 310a is a round hole, and the lock mounting bracket 260, the lock pin return spring 250, and the locking pin silencing bushing 211d are canceled to be mounted, two ends of the top surface 211 of the locking pin bracket 210 are bent downward and outward to form two fixing ears 211e and 211f, and bolt holes 261a and 262a are respectively provided on the fixing ears 211e and 211f. During mounting, the bolt holes 261a and 262a are sleeved over the two bolts 120 and the nut 130 is just used for locking.

Remaining parts of this embodiment are the same as Embodiment 1, and an unlocking principle and a locking principle are also the same as those of Embodiment 1.

Embodiment 3

A difference between this embodiment and Embodiment 1 is that: referring to FIG. 16a to FIG. 16i, an unlock pin 278 is mounted on the unlocking operating portion 276 and the unlocking operating portion further includes an unlock lever 500, where the unlock lever 500 is hinged on the rotating disc 100; an unlock slot 510 is provided on the unlock lever 500, where the unlock slot 510 includes an arc-shaped slot edge 511; the unlock pin 278 is inserted into the unlock slot 510 and is in contact with the arc-shaped slot edge 511; and when the unlock lever 500 is rotated, the unlock lever 500 drives, by using the arc-shaped slot edge 511, the unlock pin 278 to move, and drives the unlock bracket to flip around the unlock lever dowel pin 279, and the unlocking portion 275 drives, by using the convex rings 223 and 233 on the lock pins 220 and 230, the lock pins 220 and 230 to move upward, to exit the lockhole 310 and implement unlocking.

What is claimed is:

1. A vertical latch locking mechanism for a rotating seat, the vertical latch locking mechanism being configured to be mounted on a rotating disc in a seat rotation mechanism, at least one lockhole being provided on a disc surface of a fixed disc in the seat rotation mechanism, and at least one first lock pin hole being provided on the rotating disc and being aligned with a lockhole amongst the at least one lockhole, the vertical latch locking mechanism comprising:

a locking pin bracket including a top surface, at least two second lock pin holes being disposed side by side with each other in the top surface;

a lock mounting bracket disposed vertically below the locking pin bracket and to be attached to the rotating disc, at least two third lock pin holes being disposed side by side with each other in the lock mounting bracket, the at least two third lock pin holes of the lock mounting bracket being aligned one by one with the at least two second lock pin holes in the top surface of the locking pin bracket; and at least two lock pins that are disposed vertically in parallel and side by side with each other and moveably configured to pass through the at least two second lock pin holes in the locking pin bracket and to pass through the at least two third lock pin holes aligned in the lock mounting bracket with the at least two second lock pin holes in the top surface of the locking pin bracket, wherein for each lock pin amongst the at least two lock pins, a first end of the lock pin is configured to pass through a corresponding first lock pin hole amongst the at least one first lock pin hole and is configured to be inserted into the lockhole, to implement locking.

2. The vertical latch locking mechanism for a rotating seat according to claim 1, wherein the first end of the lock pin is in a cone shape.

3. The vertical latch locking mechanism for a rotating seat according to claim 1, wherein the locking pin bracket further comprises a first side surface, a second side surface, a third side surface, and a fourth side surface, the first and second side surface are downward bent from a first side and a second side of the top surface and are symmetrically located on the first and second sides of the top surface, the third and fourth side surfaces are bent from two sides of the second side surface and are attached to the first side surface, bottoms of the first through fourth side surfaces of the locking pin bracket are attached to the lock mounting bracket.

4. The vertical latch locking mechanism for a rotating seat according to claim 1, further comprising: an unlock bracket hinged on the locking pin bracket, wherein the unlock bracket is connected to the lock pins, to drive the lock pins for unlocking.

5. A vertical latch locking mechanism for a rotating seat, the vertical latch locking mechanism being configured to be mounted on a rotating disc in a seat rotation mechanism, at least one lockhole being provided on a disc surface of a fixed disc in the seat rotation mechanism, and at least one first lock pin hole being provided on the rotating disc and being aligned with a lockhole amongst the at least one lockhole, the vertical latch locking mechanism comprising:

a locking pin bracket to be attached to the rotating disc, the locking pin bracket comprising a top surface, a first side surface, a second side surface, a third side surface, and a fourth side surface; and at least two lock pins vertically and moveably configured on the locking pin bracket, wherein the first side surface and the second side surface of the locking pin bracket bend downward from a first side and a second side of the top surface of the locking pin bracket and are disposed symmetrically on the first side and the second side of the top surface, and the third side surface and the fourth side surface of the locking pin bracket bend forward from two sides of the second side surface of the locking pin bracket and are attached to the first side surface of the locking pin bracket, and second ends of the at least two lock pins pass through second lock pin holes provided on the top surface of the locking pin bracket.

6. The vertical latch locking mechanism for a rotating seat according to claim 5, wherein a locking pin silencing bushing is mounted inside each second lock pin hole, and second ends of the at least two lock pins pass through the locking pin silencing bushings.

7. The vertical latch locking mechanism for a rotating seat according to claim 5, further comprising: an unlock bracket hinged on the locking pin bracket, wherein the unlock bracket is drivingly connected to the lock pins, to drive the lock pins for unlocking.

8. The vertical latch locking mechanism for a rotating seat according to claim 7, wherein the unlock bracket is hinged on the locking pin bracket by using an unlock lever dowel pin.

9. The vertical latch locking mechanism for a rotating seat according to claim 8, wherein two first hinge lugs are symmetrically disposed on the unlock bracket, a first hinge hole is provided in each first hinge lug, a dowel pin bushing is mounted in each first hinge hole, and two ends of the unlock lever dowel pin respectively pass through two dowel pin bushings.

10. The vertical latch locking mechanism for a rotating seat according to claim 9, wherein two second lock lugs are symmetrically disposed on the first side surface of the locking pin bracket, a second hinge hole is provided in each second lock lug, and the two ends of the unlock lever dowel pin respectively pass through the second hinge holes and are anchored.

11. The vertical latch locking mechanism for a rotating seat according to claim 10, wherein a dowel pin bushing is mounted in each second hinge hole, and second ends of the two ends of the unlock lever dowel pin pass through the dowel pin bushings.

12. The vertical latch locking mechanism for a rotating seat according to claim 8, wherein an unlocking portion is disposed on the unlock bracket, at least one lock pin notch is provided on the unlocking portion, and a convex ring is disposed at a middle position of each lock pin, wherein the unlocking portion is inserted into the locking pin bracket from a bottom of the first side surface of the locking pin bracket, the at least one lock pin notch on the unlocking portion fits into a position below the convex ring on a corresponding lock pin and enables an upper surface of the unlocking portion to be in contact with a lower surface of the convex ring, and the unlock bracket drives, by using the convex ring, the lock pin to move upward to unlock.

13. The vertical latch locking mechanism for a rotating seat according to claim 12, wherein a lock pin return spring is sleeved over the second end of each lock pin, wherein a lower end of the lock pin return spring abuts against the convex ring, and an upper end of the lock pin return spring abuts against the top surface of the locking pin bracket.

14. The vertical latch locking mechanism for a rotating seat according to claim 13, further comprising a lock mounting bracket, wherein the lock mounting bracket is mounted on the rotating disc by using a fastener, and bottoms of the first side surface, the second side surface, the third side surface, and the fourth side surface of the locking pin bracket are welded to the lock mounting bracket;

a gap is left between the bottom of the first side surface and the upper surface of the lock mounting bracket, and the unlocking portion is inserted into the locking pin bracket through the gap; and two third lock pin holes are provided side by side on the lock mounting bracket, the two third lock pin holes are aligned one by one with two of the first lock pin holes on the rotating disc, and for each lock pin the first end of the lock pin passes through the third lock pin hole and the second lock pin hole.

15. The vertical latch locking mechanism for a rotating seat according to claim 14, wherein an unlocking operating portion is disposed on the unlock bracket; and the unlocking operating portion is operated to drive the unlock bracket to rotate, to implement unlocking.

16. The vertical latch locking mechanism for a rotating seat according to claim 15, wherein when the vertical latch locking mechanism is mounted on the rotating disc, mounting can be performed with the unlocking operating portion facing the outside of the rotating disc or with the unlocking operating portion facing the inside of the rotating disc.

17. The vertical latch locking mechanism for a rotating seat according to claim 16, wherein an unlock cable hanger lug is disposed on the unlocking operating portion, and an end of an unlock cable is connected to the unlock cable hanger lug.

18. The vertical latch locking mechanism for a rotating seat according to claim 17, wherein an unlock pin is mounted on the unlocking operating portion and the unlocking operating portion further comprises an unlock lever, wherein the unlock lever is hinged on the rotating disc;

an unlock slot is provided on the unlock lever, wherein the unlock slot comprises an arc-shaped slot edge;

the unlock pin is inserted into the unlock slot and is in contact with the arc-shaped slot edge; and when the unlock lever is rotated, the unlock lever drives, by using the arc-shaped slot edge, the unlock pin to move, to drive the unlock bracket to unlock.

19. The vertical latch locking mechanism for a rotating seat according to claim 5, wherein climbing slopes are respectively disposed on two sides of the lockhole that is along a rotation direction of the rotating disc and that is on the disc surface of the fixed disc, and the lockhole is located at a highest position of the climbing slope.

* * * * *